(12) United States Patent
Jayanthi et al.

(10) Patent No.: US 9,990,228 B1
(45) Date of Patent: Jun. 5, 2018

(54) VALIDATING NETWORK PARAMETERS OF A CONTAINERIZED APPLICATION

(71) Applicant: Hewlett Packard Enterprise Development LP, Houston, TX (US)

(72) Inventors: Swaroop Jayanthi, Hyderabad (IN); Brahmanand Vuppuluri, Bangalore (IN); Rajesh Teeparti, Bangalore (IN); Surya Charan Alluri, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 17 days.

(21) Appl. No.: 15/415,518

(22) Filed: Jan. 25, 2017

(51) Int. Cl.
*G06F 9/445* (2018.01)
*G06F 9/48* (2006.01)
*H04L 29/08* (2006.01)

(52) U.S. Cl.
CPC .............. *G06F 9/4856* (2013.01); *G06F 8/61* (2013.01); *H04L 67/10* (2013.01)

(58) Field of Classification Search
CPC ........... G06F 9/4856; G06F 8/61; H04L 67/10
USPC .......................................................... 717/177
See application file for complete search history.

(56) References Cited

U.S. PATENT DOCUMENTS

| 8,352,608 | B1 * | 1/2013 | Keagy ................. | G06F 8/63 709/220 |
| 9,268,935 | B2 * | 2/2016 | Lindo ................... | G06F 21/53 |
| 2015/0142878 | A1 * | 5/2015 | Hebert .................. | H04L 67/10 709/203 |
| 2016/0330277 | A1 * | 11/2016 | Jain ..................... | H04L 67/1095 |

FOREIGN PATENT DOCUMENTS

CN 105955805 9/2016

OTHER PUBLICATIONS

Musa, I. K. et al., "Self-Service Infrastructure Container for Data Intensive Application", (Research Paper), Journal of Cloud Computing Advances, Systems and Applications 2014. May 22, 2014, vol. 3 No. 5., 31 pages.

\* cited by examiner

*Primary Examiner* — Anna Deng
(74) *Attorney, Agent, or Firm* — Lakshmikumaran and Sridharan

(57) ABSTRACT

Examples described relate to validating network parameters of a containerized application. In an example, the current state of a network parameter configured for a containerized application in a cloud computing environment may be determined. The current state of the network parameter may be validated against a container application profile of the containerized application, wherein the container application profile specifies a desired state of the network parameter. In response to a determination that the current state of the network parameter does not meet the desired state of the network parameter specified in the container application profile, a determination may be made whether a network interface that meets the desired state of the network parameter is available in the cloud computing environment. In response to a determination that the network interface is available in the cloud computing environment, the containerized application may be migrated to the available network interface.

20 Claims, 4 Drawing Sheets

VALIDATING NETWORK PARAMETERS OF A CONTAINERIZED APPLICATION

BACKGROUND

The Information technology (IT) infrastructure of organizations may vary in scale and scope based on the size and requirements of organizations. For example, the number of software applications deployed in an organization may vary from a few basic software applications (for example, email) to large and complex applications.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
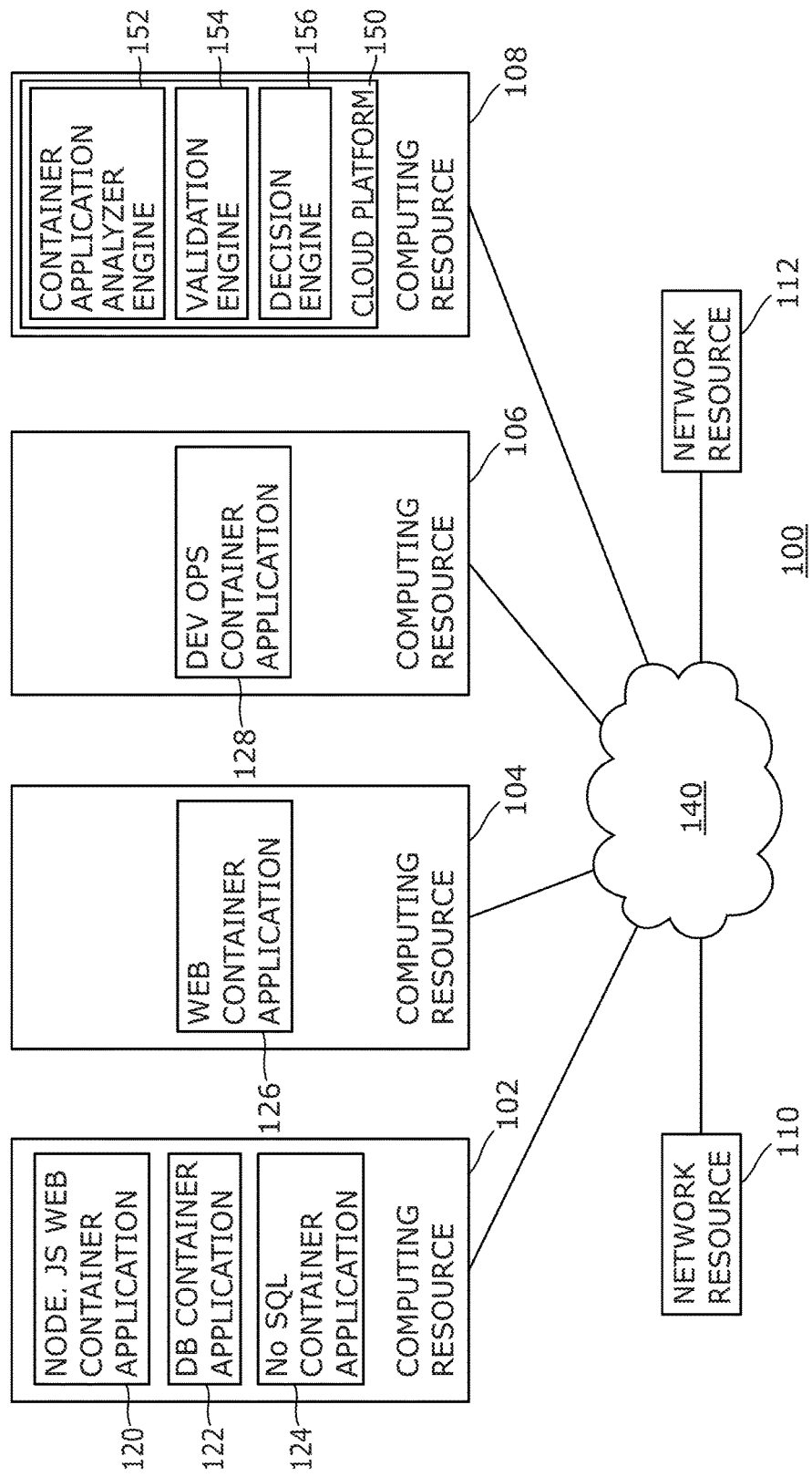
FIG. 1 is a block diagram of an example computing environment for validating network parameters of a containerized application.

The IT environment of an enterprise may comprise a handful of software applications to hundreds of applications. Managing the entire software lifecycle of these applications may pose technical challenges. One of these challenges may relate to portability of a software application from one computing environment to another. In one example scenario, this may include porting an application from a staging environment to a production environment. In another example, an application may need to be ported from a physical machine environment to a virtual machine environment. Organizations are thus increasingly looking at simple portable solutions that could help them package, ship, and run their software applications on a variety of computing platforms. Software containers may offer one such option.

Software containers may provide a mechanism to securely run an application in an isolated environment, which may be packed with all its dependencies and libraries. A software container thus may include an entire runtime environment: an application, its dependencies, libraries, and configuration files that may be bundled into one package. Such an application package may be referred to as a "containerized application" or "container application". Since an application may be run in an environment that the application expects, software containers may simplify testing and deployment of an application.

Containerized applications are gaining acceptance at rapid pace since they are easy to deploy and use. In a cloud computing environment, users may provision containerized applications depending on their requirements. However, over a period of time, the number of containerized applications may increase. This may lead to reduced network bandwidth, throughput, and network congestion, which, in turn, may increase the overall cost of network management and decrease the Quality of Service (QoS) offered by a cloud computing environment.

Analyzing network requirements of each containerized application in a cloud, and managing the overall network usage by the containerized applications may be a challenging task since, for example, network QoS parameters for each of the containerized applications may vary. It may be desirable to provide a networking solution that adapts with the changing requirements of containerized applications. For example, it may be desirable to provide a solution that automates the migration of a container application from a current network interface (for example, Ethernet) to a relatively more optimal network interface (for example, Single Root I/O Virtualization (SR-IOV) interface).

To address these technical challenges, the present disclosure describes various examples for validating network parameters of a containerized application. In an example, the current state of a network parameter configured for a containerized application in a cloud computing environment may be determined. The current state of the network parameter may be validated against a container application profile of the containerized application, wherein the container application profile specifies a desired state of the network parameter. In response to a determination that the current state of the network parameter does not meet the desired state of the network parameter specified in the container application profile, a determination may be made whether a network interface that meets the desired state of the network parameter is available in the cloud computing environment. In response to a determination that the network interface is available in the cloud computing environment, the containerized application may be migrated to the available network interface.

FIG. 1 is a block diagram of an example computing environment 100 for validating network parameters of a containerized application. In an example, computing environment 100 may include computing resources 102, 104, 106, and 108, and network resources 110 and 112. Although four computing resources, and two network resources are shown in FIG. 1, other examples of this disclosure may include more or less than four computing resources, and more or less than two network resources.

Computing resources 102, 104, 106, and 108 may each be a hardware computing resource (e.g., includes at least one processor). The hardware computing resource may represent any type of system capable of reading machine-executable instructions. Examples of the hardware computing resource may include a server, a desktop computer, a notebook computer, a tablet computer, a thin client, a mobile device, a personal digital assistant (PDA), and the like. In an example, computing resources 102, 104, 106, and 108 may each represent software resources (machine-executable instructions). The software resources may include, for example, operating system software, firmware, and application software. Other examples of the software resources may include virtual machines, virtual servers, load balancers, firewalls, etc. In an example, computing resources 102, 104, 106, and 108 may each be a combination of hardware and software resources.

In an example, computing resources 102, 104, 106, and 108, may each deploy one or a plurality of containerized applications. For example, a host operating system (OS) on computing resource 102 may deploy a Node.JS Web container application 120 for an E-commerce service, a DB container application 122 for database workload, and a NoSQL container 124 application for unstructured data. In an example, the host OS on computing resource 102 may be configured with an Ethernet network interface. A host OS on computing resource 104 may host a Web container application 126. In an example, the host OS on computing resource 104 may be configured with an Ethernet network interface and a Single Root I/O Virtualization (SR-IOV) network interface. A host OS on computing resource 106 may host a DevOps container application 128. In an example, the host operating system on computing resource 106 may be configured with a SRIOV network interface.

Network resources 110 and 112 may each be a network device, a network software, or any combination thereof. Some non-limiting examples of the network device may include a hub, a network switch, a network router, a virtual switch, and a virtual router. Some non-limiting examples of the network software may include Transmission Control Protocol (TCP), User Datagram Protocol (UDP), and Open-Switch Linux Network Operating System.

Computing resources 102, 104, 106, and 108, and network resources 110 and 112 may be communicatively coupled, for example, via a computer network 140. Computer network 140 may be a wireless or wired network. Computer network 140 may include, for example, a Local Area Network (LAN), a Wireless Local Area Network (WAN), a Metropolitan Area Network (MAN), a Storage Area Network (SAN), a Campus Area Network (CAN), or the like. Further, computer network 140 may be a public network (for example, the Internet) or a private network (for example, an intranet).

In an example, computing environment 100 may represent a cloud computing environment, and computing resources 102, 104, 106, and 108, and network resources 110 and 112 may be referred to as cloud resources. Cloud computing environment 100 may represent a public cloud, a private cloud, a community cloud, or a hybrid cloud. Cloud computing environment 100 may be used to provide or deploy various types of cloud services. These may include Infrastructure as a Service (IaaS), Platform as a Service (PaaS), Software as a Service (SaaS), and so forth. In another example, computing environment 100 may represent a data center.

In an example, cloud computing environment 100 may include a cloud platform 150. As used herein, a "cloud platform" may refer to a tool (software and/or hardware) which may be used to manage resources in a cloud computing environment. In an example, cloud platform 150 may be used to manage computing resources 102, 104, 106, and 108, and network resources 110 and 112. In an example, one or more of computing resources 102, 104, 106, and 108, and network resources 110 and 112 may be used by the cloud platform 150 to provide a cloud service (for example, IaaS) to a user. From a user's perspective, the cloud platform 150 may be used, for example, to request a new cloud service and manage an existing cloud service. Users may also use the cloud platform 150 to view a status of a pending cloud service request, pending approvals, and approved service subscriptions. A non-limiting example of the cloud platform may include OpenStack.

The cloud platform 150 may be hosted on one or a plurality of computing resources 102, 104, 106, and 108. For the sake of simplicity in illustration, FIG. 1 illustrates cloud platform 150 on computing resource 108, by way of an example. However, any of the other computing resources (for example, 102, 104, and 106) may host cloud platform 150 as well. In an example, cloud platform 150 may include a container application analyzer engine 152, a validation engine 154, and a decision engine 156. For the sake of simplicity in illustration, computing resource 108 is shown to include container application analyzer engine 152, validation engine 154, and decision engine 156. However, any of the other computing resources (for example, 102, 104, and 106) may include these engines.

Engines 152, 154, and 156 may include any combination of hardware and programming to implement the functionalities of the engines described herein, but at least include hardware that is configured to perform the functionalities. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the computing resource 108. In some examples, the at least one machine-readable storage medium may store instructions that, when executed by the at least one processing resource, at least partially implement some or all engines of computing resource 108. In such examples, the computing resource 108 may include the at least one machine-readable storage medium storing the instructions and the at least one processing resource to execute the instructions.

In an example, engines 152, 154, and 156 may be a part of a Representational state transfer (RESTful) service or Application Programming Interface (API). In an example, the RESTful service may be referred to as Simple Container Network Service (SCNS). In an example, the SCNS service may be included as a plug-in to cloud platform 150.

Container application analyzer engine 152 may determine network parameters configured for each of the containerized applications on a cloud platform along with their respective states. As used herein, a "state" of a network parameter may represent a current condition of the parameter, which may include, for example, a current value of the parameter. For example, container application analyzer engine 152 may determine network parameters configured for each of the containerized applications (for example, Node.JS Web container application, DB container application, NoSQL container application, Web container application, and DevOps container application) on cloud platform 150. The network parameters may include hardware parameters and/or software parameters. Examples of the network parameters may include NIC Hardware Buffer, Socket Queue, Receive Side Scaling (RSS), Receive Packet Steering (RPS), Receive Flow Steering (RFS), bandwidth, packet loss, congestion, speed, collision, and read/write latency.

Container application analyzer engine 152 may store network parameters configured for a containerized application along with their current state as metadata. In an example, the metadata may be defined using a Containerized App Format (CAF) data structure, which may be associated with the containerized application. In an example, the CAF data structure may be based on JavaScript Object Notation (JSON), though other formats or notations are possible. An example of the CAF data structure for a containerized application is given below.

{
 'UUID:'UUID-9'
 'App-Type': 'OS'
 'App-Vendor': 'HP',
 'App-Version':'1.0',
 'App-Created':'10-1-2015',
 'App-Last-Accessed':'11-1-2015',
 'network-configured': {
   Interface-name: "veth0",
   bandwidth: 2 gbps,
   network-type: Ethernet,

```
"perf-data":{
    "date": "9-10-2016",
    "time": "9:20 AM",
    "bandwidth":1 gbps,
    "collision":yes,
    "packet-loss":"yes",
    "congestion":"yes",
  network-buffer:0,
    RSS:0,
    RPS:1,
    RFS:1,
    queue-length:rx,
  }
 }
}
``` wherein UUID may represent a Universal Unique Identifier (UUID) of the containerized application, and "0" and "1" may indicate an enabled or a disabled state of a parameter, respectively.

In an example, determining the current state of a network parameter may include scanning a data structure (for example, CAF) associated with the containerized application by container application analyzer engine 152.

Validation engine 154 may validate the current state of a network parameter(s) determined by container application analyzer engine 152 for a containerized application against a container application profile (CAP) of the containerized application. A container application profile of a containerized application may specify a desired state of a network parameter(s) for the containerized application. As used herein, the "desired state" of a network parameter may refer to a state (for example, a value) which the network parameter is desired to meet. The container application profile of a containerized application may be defined by a user or it may be system-defined. An example container application profile of a containerized application specifying desired states of example network parameters is given below.

i) Bandwidth: 2 gbps
ii) Congestion: yes
iii) Collision: yes
iv) Packet loss=no
v) RFS=0
vi) RSS=0
vii) RPS=1 wherein "0" and "1" may indicate an enabled or a disabled state of a parameter, respectively.

In an example, validation engine 154 may refer to the CAF data structure of a containerized application to validate the current state of a network parameter(s) for the containerized application against its desired state defined in the container application profile of the application. For example, validation engine 154 may determine the current state of network parameter "bandwidth" (for example, 1 gbps), and compare it against its desired value in the CAP (for example, 2 gbps) of the containerized application.

In response to a determination by validation engine 154 that the current state of a network parameter(s) does not meet the desired state of the network parameter(s) specified in the container application profile of the containerized application, container application analyzer engine 152 may determine whether a network interface that meets the desired state of the network parameter may be available in the cloud. As mentioned earlier, container application analyzer engine 152 may determine the current state of a network parameter(s) configured for each containerized application in a cloud. Thus, the information to make the aforementioned determination may already be available with container application analyzer engine 152. For example, if validation engine 154 determines that the current state of network parameter "bandwidth" (for example, 1 gbps) does not meet its desired value in the CAP (for example, 2 gbps) of the containerized application, container application analyzer engine 152 may determine whether a network interface that meets the desired state of the network parameter (for example, 2 gbps) is available in the cloud.

In response to a determination by container application analyzer engine 152 that a network interface that meets the desired state of the network parameter (for example, 2 gbps) is available in the cloud, decision engine 156 may migrate the containerized application to the available network interface. In an example, the migration may involve migration of the containerized application from a current network interface (for example, Ethernet) to another relatively more optimal network interface (for example, Single Root I/O Virtualization (SR-IOV) interface or Multi-root I/O Virtualization (MR-IOV) interface) or vice versa. In an example, the available network interface may be present on the same computing resource. In such case, the migration may involve modifying access to the containerized application from the current network interface to the available network interface. In another example, the available network interface may be present on a different computing resource. In such case, the migration may involve migrating a copy of the container application to a computing resource that includes the available network interface and installing the containerized application on the computing resource. The copy of the container application may be generated by container application analyzer engine 152.

Referring to FIG. 1, for example, if validation engine 154 determines that the current state of a network parameter configured for Node.JS Web application container does not meet its desired value in the CAP of the application, container application analyzer engine 152 may determine whether another network interface is available in the cloud that meets the desired state of the network parameter. And, in response to a determination by container application analyzer engine 152 that an interface (for example, SR-IOV) on computing resource 106, for example, may meet the desired state of the network parameter, decision engine 156 may migrate the Node.JS Web application from its current network interface (for example, Ethernet) to the available network interface (for example, SR-IOV).

The aforementioned example illustrates validation of one network parameter (for example, bandwidth) by validation engine 154. However, in other examples, more than one network parameter (for example, bandwidth) may be considered for validation by validation engine 154. In the latter scenario, container application analyzer engine 152 may consider more than one network parameter while determining whether another network interface is available that meets the desired state of the network parameters under consideration.

In response to a determination by container application analyzer engine 152 that a network interface that meets the desired state of the network parameter is not available in the cloud, decision engine 156 may perform an action in regard to the containerized application. In this regard, decision engine may refer to a rule(s). A "rule" may specify an action to be performed in regard to the containerized application in the event a network parameter or a set of network parameters configured for the containerized application meets a condition specified in the rule. In an example, the rule(s) may be defined in the container application profile (CAP) of a containerized application. To provide an example, a rule may specify a condition that if current "bandwidth" of a containerized application is less than 2 gbps (as defined in the CAP), the containerized application may be purged. The latter may be the "action" (e.g., purging the containerized application) defined against the condition. In another, a rule may specify a condition that if packet loss for a containerized application is more than a pre-defined amount, the containerized application may be purged.

A rule may include multiple conditions for an action. For example, a rule may specify conditions that if a set of network parameters (for example, bandwidth <2 gbps and collision=no) are more or less than their pre-defined desired states, the containerized application may be purged.

A rule may specify an action or a plurality of actions that may be performed in relation to a containerized application in the event a network parameter(s) configured for the application meets the condition(s) specified in the rule. Some non-limiting examples of these actions may include: purging a containerized application; marking or labeling the containerized application for exclusion from a backup process; and sending a notification to a user (for example, a cloud service provider). In an example, the notification indicates a disparity between the current state of the network parameter and the desired state of the network parameter.

In an example, validation engine 154 may validate a network parameter(s) configured for a containerized application against its CAP at regular time periods or at a scheduled time, upon user request, and/or upon a predefined trigger.

Figure 2:
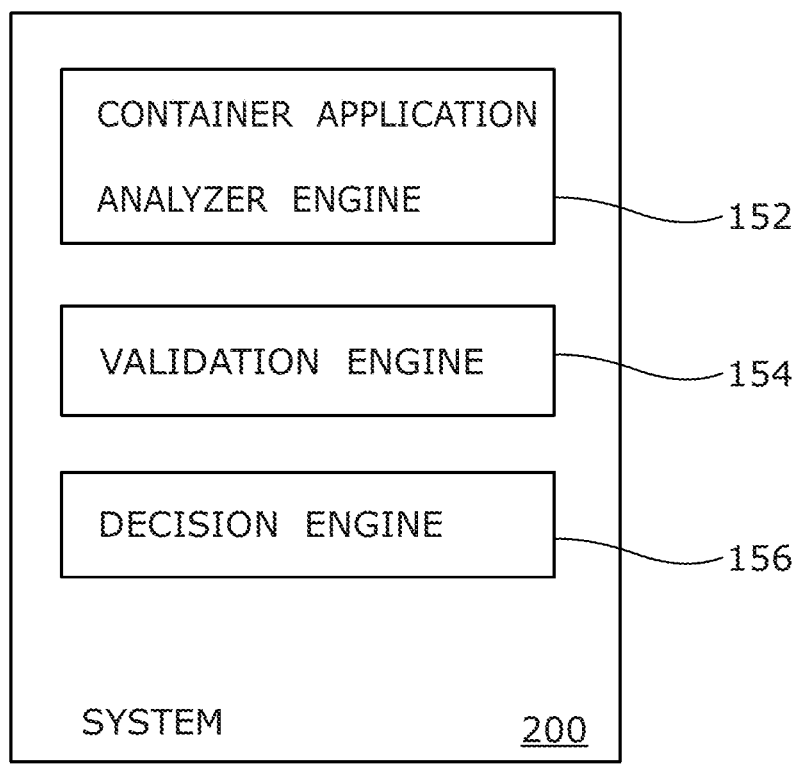
FIG. 2 is a block diagram of an example computing system for validating network parameters of a containerized application.

FIG. 2 is a block diagram of an example computing system 200 for validating network parameters of a containerized application. In an example, computing system 200 may be analogous to the computing resource 104 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

In an example, system 200 may represent any type of computing device capable of reading machine-executable instructions. Examples of computing device may include, without limitation, a server, a desktop computer, a notebook computer, a tablet computer, a thin client, a mobile device, a personal digital assistant (PDA), and the like.

In an example, system 200 may include a container application analyzer engine 152, a validation engine 154, and a decision engine 156.

In an example, container application analyzer engine 152 may determine a current state of a network parameter configured for a containerized application in a cloud. Validation engine 154 may validate the current state of the network parameter against a container application profile of the containerized application, wherein the container application profile specifies a desired state of the network parameter. In response to a determination that the current state of the network parameter does not meet the desired state of the network parameter specified in the container application profile, container application analyzer engine 152 may determine whether a network interface that meets the desired state of the network parameter is available in the cloud. In an example, the network interface that meets the desired state of the network parameter is defined in the container application profile of the containerized application. In response to a determination that the network interface is available in the cloud, decision engine 156 may migrate the containerized application to the network interface.

Figure 3:
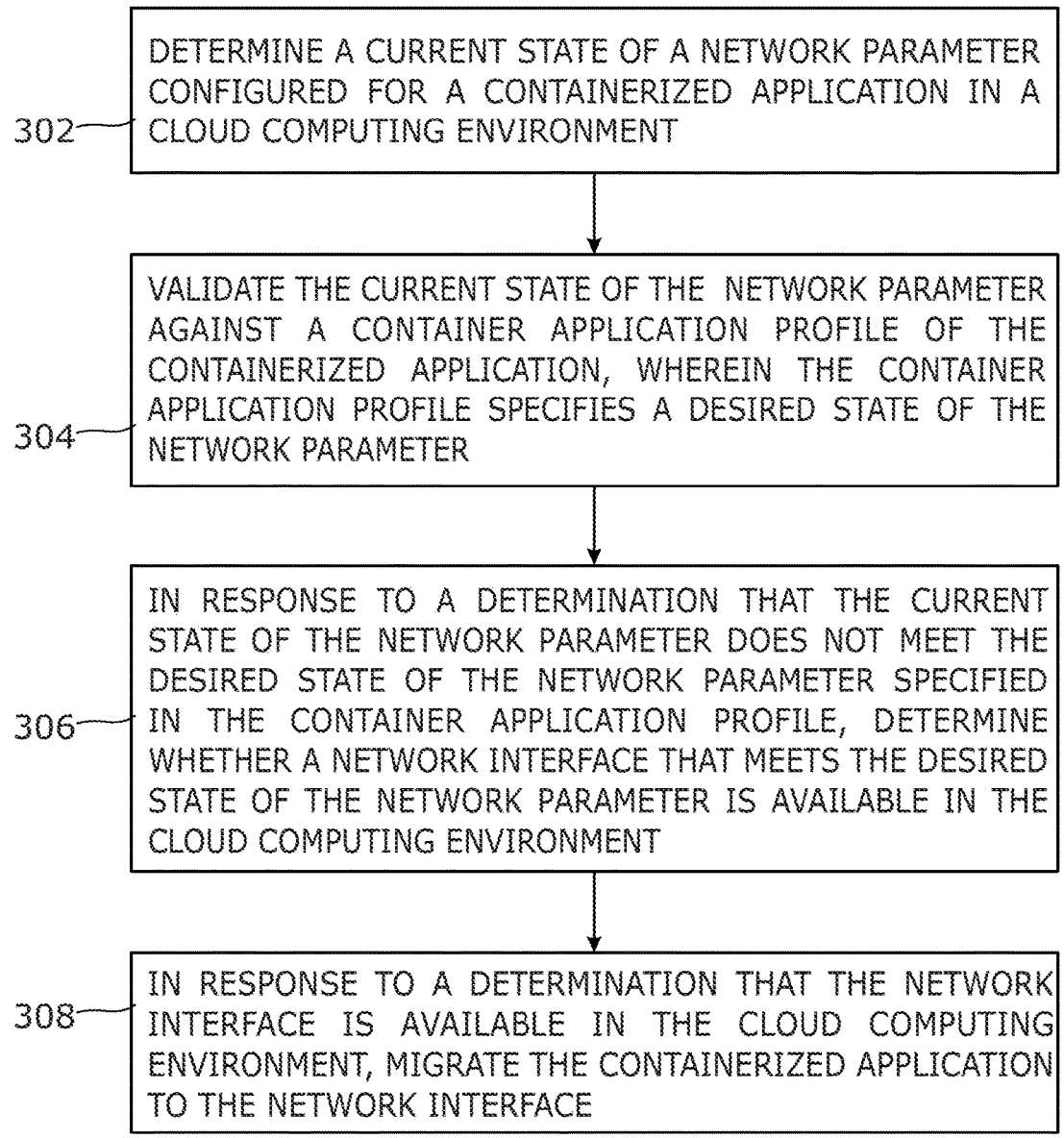
FIG. 3 is a flowchart of an example method of validating network parameters of a containerized application.

FIG. 3 is a flowchart of an example method 300 of validating network parameters of a containerized application. The method 300, which is described below, may be executed on a computing device such as computing resource 108 of FIG. 1 or system 200 of FIG. 2. However, other computing devices may be used as well. At block 302, the current state of a network parameter configured for a containerized application in a cloud may be determined. At block 304, the current state of the network parameter may be validated against a container application profile of the containerized application, wherein the container application profile includes a desired state of the network parameter. At block 306, in response to a determination that the current state of the network parameter does not meet the desired state of the network parameter specified in the container application profile, a determination may be made whether a network interface that meets the desired state of the network parameter is available in the cloud. At block 308, in response to a determination that the network interface is available in the cloud, the containerized application may be migrated to the available network interface.

Figure 4:
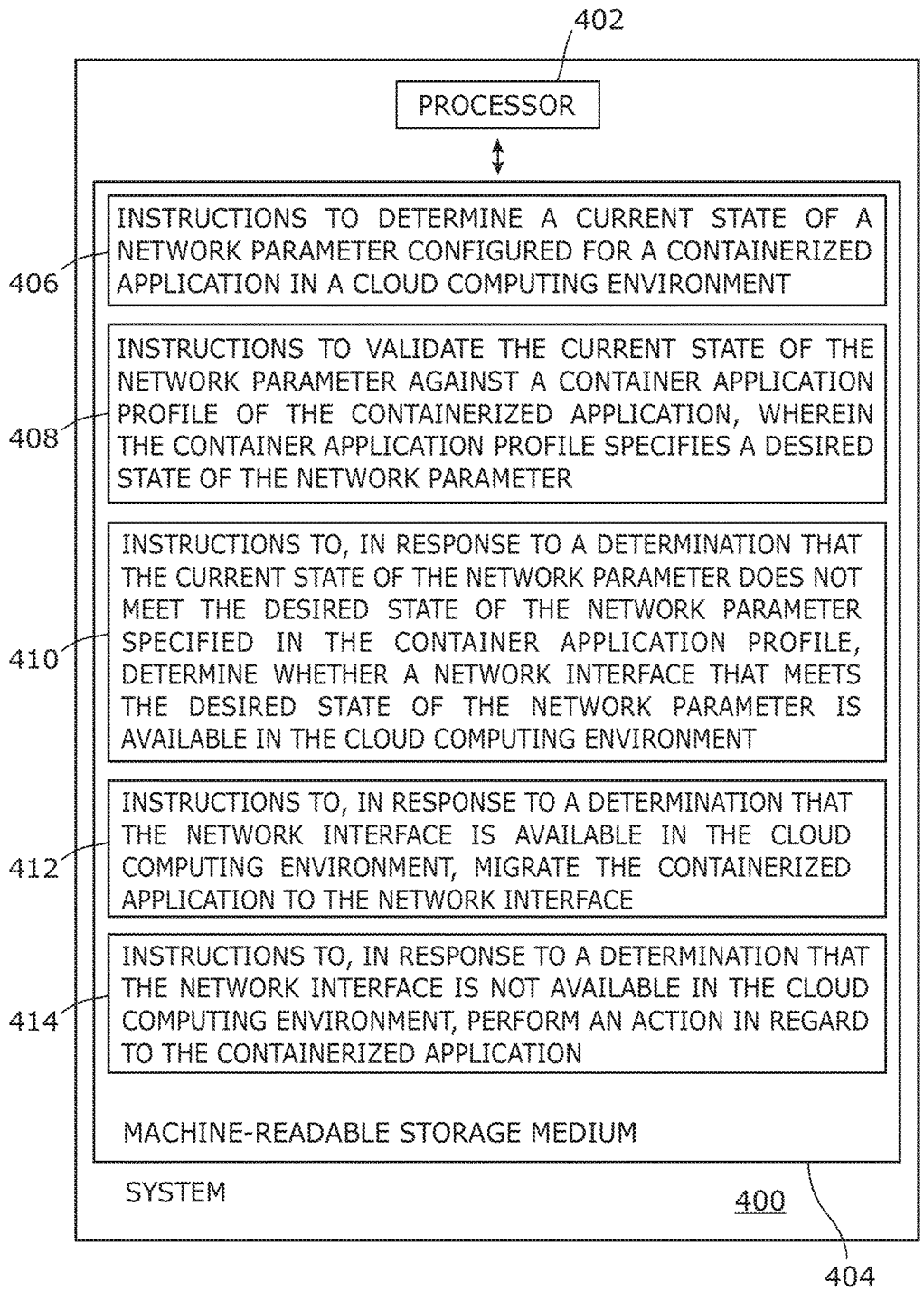
FIG. 4 is a block diagram of an example system including instructions in a machine-readable storage medium for validating network parameters of a containerized application.

FIG. 4 is a block diagram of an example system 400 including instructions in a machine-readable storage medium for validating network parameters of a containerized application. System 400 includes a processor 402 and a machine-readable storage medium 404 communicatively coupled through a system bus. In some examples, system 400 may be analogous to a computing resource 104 of FIG. 1 or systems 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406, 408, 410, 412, and 414. In an example, instructions 406 may be executed by processor 402 to determine a current state of a network parameter configured for a containerized application in a cloud. Instructions 408 may be executed by processor 402 to validate the current state of the network parameter against a container application profile of the containerized application, wherein the container application profile specifies a desired state of the network parameter. Instructions 410 may be executed by processor 402 to, in response to a determination that the current state of the network parameter does not meet the desired state of the network parameter specified in the container application profile, determine whether a network interface that meets the desired state of the network parameter is available in the cloud. Instructions 412 may be executed by processor 402 to, in response to a determination that the network interface is available in the cloud, migrate the containerized application to the network interface. Instructions 414 may be executed by processor 402 to, in response to a determination that the network interface is not available in the cloud, perform an action in regard to the containerized application.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method comprising:
   determining, by a processor, a current state of a network parameter configured for a containerized application in a cloud computing environment from a data structure associated with the containerized application that includes data related to network parameters;
   validating, by the processor, the current state of the network parameter against a container application profile of the containerized application, wherein the container application profile specifies a desired state of the network parameter;
   in response to a determination that the current state of the network parameter does not meet the desired state of the network parameter specified in the container application profile, determining, by the processor, whether a network interface that meets the desired state of the network parameter is available in the cloud computing environment; and
   in response to a determination that the network interface is available in the cloud computing environment, migrating, by the processor, the containerized application from a current network interface to the available network interface, wherein the migrating comprises migrating a copy of the container application to a computing resource that includes the available network interface, and installing the containerized application on the computing resource.

2. The method of claim 1, further comprising:
   in response to a determination that the network interface is not available in the cloud computing environment, performing an action in regard to the containerized application.

3. The method of claim 1, wherein the network interface is one of a Single Root I/O Virtualization (SR-IOV) interface and a Multiple Root I/O Virtualization (MR-IOV) interface.

4. The method of claim 1, wherein determining the current state of the network parameter includes:
   scanning the data structure associated with the containerized application that includes data related to network parameters, including the network parameter, configured for the containerized application.

5. The method of claim 4, wherein the validating comprises:
   referring to the data structure associated with the containerized application, wherein the data structure includes the current state of the network parameter; and
   comparing the current state of the network parameter against the desired state of the network parameter specified in the container application profile.

6. The method of claim 1, wherein migrating comprises:
   modifying access to the containerized application from the current network interface to the available network interface in an event the current network interface and the available network interface are present on same computing resource.

7. The method of claim 1, wherein migrating comprises:
   generating the copy of the container application;
   migrating the copy of the container application to a computing resource that includes the available network interface; and
   installing the containerized application on the computing resource.

8. A system includes a processor, the system comprising:
   a container application analyzer engine to determine a current state of a network parameter configured for a containerized application in a cloud computing environment from a data structure associated with the containerized application that includes data related to network parameters;
   a validation engine to validate the current state of the network parameter against a container application profile of the containerized application, wherein the container application profile specifies a desired state of the network parameter;
   the container application analyzer engine to, in response to a determination that the current state of the network parameter does not meet the desired state of the network parameter specified in the container application profile, determine whether a network interface that meets the desired state of the network parameter is available in the cloud computing environment; and
   a decision engine to, in response to a determination that the network interface is available in the cloud computing environment, migrate the containerized application from a current network interface to the available network interface, wherein the migration involves migration of a copy of the containerized application to and installation of the containerized application on a computing resource that includes the available network interface.

9. The system of claim 8, wherein the network parameter includes at least one of NIC Hardware Buffer, Socket Queue, Receive Side Scaling (RSS), Receive Packet Steering (RPS), Receive Flow Steering (RFS), bandwidth, packet loss, congestion, speed, collision, and read/write latency.

10. The system of claim 8, wherein the current network interface includes an Ethernet network interface and the available network interface includes a Single Root I/O Virtualization (SR-IOV) interface.

11. The system of claim 8, wherein the current network interface includes an Ethernet network interface and the available network interface includes a Multiple Root I/O Virtualization (MR-IOV) interface.

12. The system of claim 8, wherein the container application analyzer engine to generate a structure related to the containerized application that includes data related to network parameters, including the network parameter, configured for the containerized application, wherein the data structure is defined in a JavaScript Object Notation (JSON) format.

13. A non-transitory machine-readable storage medium comprising instructions, the instructions executable by a processor to:
   determine a current state of a network parameter configured for a containerized application in a cloud computing environment from a data structure associated with the containerized application that includes data related to network parameters;
   validate the current state of the network parameter against a container application profile of the containerized application, wherein the container application profile specifies a desired state of the network parameter;
   in response to a determination that the current state of the network parameter does not meet the desired state of the network parameter specified in the container application profile, determine whether a network interface that meets the desired state of the network parameter is available in the cloud computing environment;
   in response to a determination that the network interface is available in the cloud computing environment, migrate the containerized application from a current network interface to the available network interface, wherein the migration includes migration of a copy of the containerized application to a computing resource that includes the available network interface, and installation of the containerized application on the computing resource; and
   in response to a determination that the network interface is not available in the cloud computing environment, perform an action in regard to the containerized application.

14. The storage medium of claim 13, wherein the action is specified in the container application profile of the application.

15. The storage medium of claim 13, wherein the action includes to purge the containerized application.

16. The storage medium of claim 13, wherein the action includes to exclude the containerized application from a backup process.

17. The storage medium of claim 13, wherein the action includes to send a notification related to the containerized application to a user.

18. The storage medium of claim 17, wherein the notification indicates a disparity between the current state of the network parameter and the desired state of the network parameter.

19. The storage medium of claim 13, wherein the instructions to migrate include instructions to:
   generate a copy of the containerized application.

20. The storage medium of claim 13, wherein the available network interface is present on a computing resource other than a host computing interface that includes the current network interface.

* * * * *